Dec. 20, 1960  C. B. KREKELER  2,965,365
BIT AND RESILIENT HOLDING MEANS THEREFOR
Filed April 14, 1958  2 Sheets-Sheet 1

INVENTOR.
CLAUDE B. KREKELER,
BY Allen & Allen
ATTORNEYS.

Dec. 20, 1960
C. B. KREKELER
2,965,365
BIT AND RESILIENT HOLDING MEANS THEREFOR
Filed April 14, 1958
2 Sheets-Sheet 2
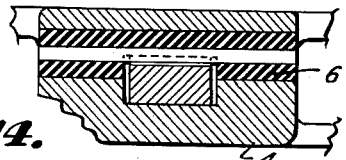
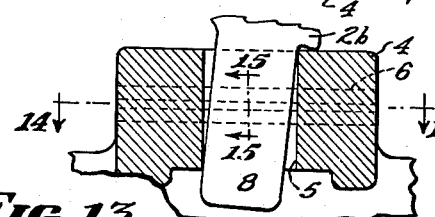
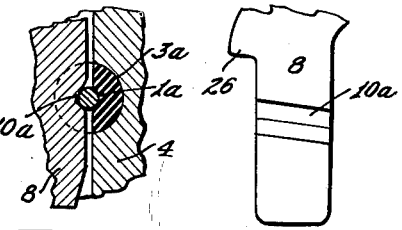
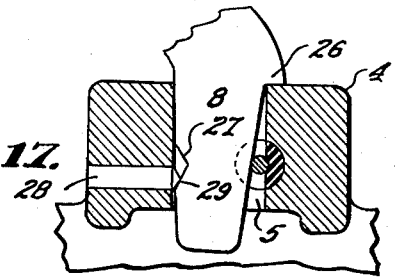
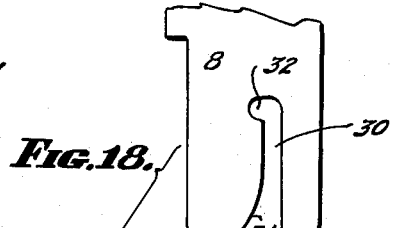
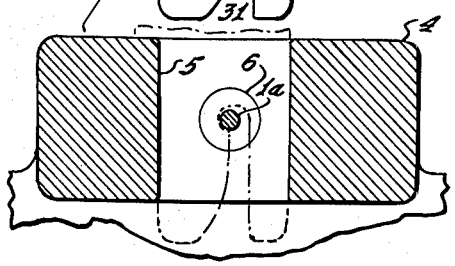
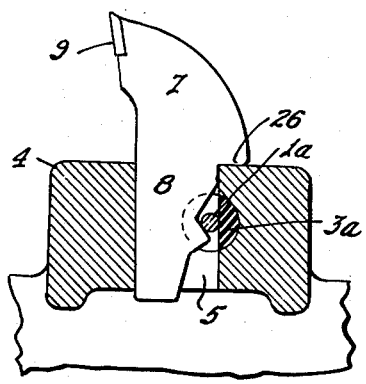
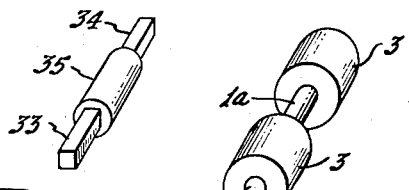
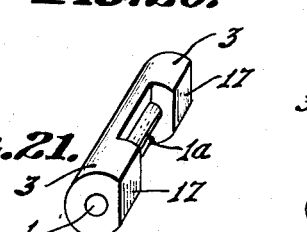
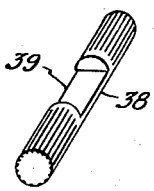
INVENTOR.
CLAUDE B. KREKELER,
BY
ATTORNEYS.

United States Patent Office 2,965,365
Patented Dec. 20, 1960

2,965,365

BIT AND RESILIENT HOLDING MEANS THEREFOR

Claude B. Krekeler, Monfort Heights, Ohio, assignor to The Cincinnati Mine Machinery Co., Cincinnati, Ohio, a corporation of Ohio Filed Apr. 14, 1958, Ser. No. 728,476

21 Claims. (Cl. 262—33)

In a copending application Serial No. 659,562, entitled Cutter Bit and Socket Structures, filed June 15, 1957, there are described various forms of cutter bit and socket structures, such as may be employed in mining machinery where a primary object is the provision of a structure comprising a socket member perforated to accept the shank of a cutter bit or cutter bit holder, and including means whereby the shank will be held in the perforation in a proper position to withstand the strains of cutting; but where the arrangement of parts is such that the shank may be inserted in the perforation by a simple driving operation and later removed by a simple prying operation, thus eliminating the use of set screws and other devices requiring adjustment. In the teachings of the said application, resiliently actuated means are provided to hold the shank within the perforation and to permit its withdrawal.

The resiliently actuated means are for the most part in the form of plungers operating in bores intersecting the shank receiving perforation of the socket members. It will be understood that mining machinery is subjected to excessive vibration and wear as well as to the corrosive action of acid mine waters. Complex mechanical structures comprising numerous parts thus present serious problems. The use of springs to provide resilient actuation is disadvantageous. Better results are obtained by backing the plunger devices with bodies of resilient rubbery substances; but to permit these bodies to contract longitudinally beyond the plungers, it has been found necessary to provide for what may be termed lateral expansion of the bodies, since the rubbery substance in the mass is substantially non-compressible. Lateral expansion has been provided for in various ways as by grooving the resilient body, providing longitudinal perforations in it, or providing apertures or orifices in adjacent parts into which the rubbery substance may expand. These features complicate the construction, particularly when it is remembered that mining machinery is subjected to the abrasive action of fine cuttings which also tend to fill and pack into orifices. Further, the need for periodic renewal of the resilient devices is a factor making for expense and complication.

One of the principal objects of this invention is the provision of a resilient controlling or retaining means which does not suffer from the above defects.

Another object of the invention is the provision of a resilient device which does not depend for its action upon the longitudinal contraction of a body of resilient substance accompanied by its lateral expansion, but instead operates through resilient displacement only.

It is an object of the invention to provide a resilient means of exceedingly simple and inexpensive construction.

It is an object of the invention to provide a resilient means which is self-contained, and the operation of which will not be affected by the accumulation of mine cuttings in the resilient means itself, as well as to provide a resilient means which will be more resistant to the action of corrosive mine waters.

It is an object of the invention to provide a resilient means capable of being used in a wide variety of ways with the shanks of cutter bits and cutter bit holders to obtain various effects as hereinafter more fully explained.

It is an object of the invention to provide a resilient means which is easily installed, readily replaced, and which does not complicate the structure either of the shank or of the socket member.

The provision of various combinations of socket members, resilient means, and bit shank for the performance of various functions, may also be considered as objects of the invention, as will hereinafter be explained.

These and other objects of the invention which will be set forth hereinafter or will be apparent to one skilled in the art upon reading these specifications, are accomplished by that structure and arrangement of parts of which certain exemplary embodiments will now be described. Reference is made to the accompanying drawings wherein:

Figure 13 is a longitudinal sectional view of a socket member showing a resilient means and a bit shank wherein tilting is obtained in a different way.

Figure 14 is a transverse sectional view taken along the section line 14—14 of Figure 13.

Figure 15 is a partial sectional view taken along the section line 15—15 of Figure 13.

Figure 16 is a partial side elevation of the shank of the bit employed in Figures 13 to 15.

Figure 17 is a longitudinal sectional view of a socket member showing yet another arrangement of parts, and particularly one wherein a resilient engagement means is combined with a non-resilient engagement means.

Figure 18 is an exploded view showing a socket member in longitudinal section together with a resilient means and a special bit shank for coaction therewith.

Figure 19 is a perspective view of a modified form of resilient means.

Figure 20 shows a socket member in longitudinal section, a resilient means and yet another form of bit shank.

Figure 21 is a perspective view of a modified form of resilient means.

Figures 22 and 23 are perspective views of different forms of pins.

Figure 1:
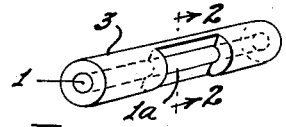
Figure 1 is a perspective view of a simple form of the resilient means of this invention.
Figure 2:
Figure 2 is a transverse sectional view thereof taken along the line 2—2 of Figure 1.
Figures 2A, 6:
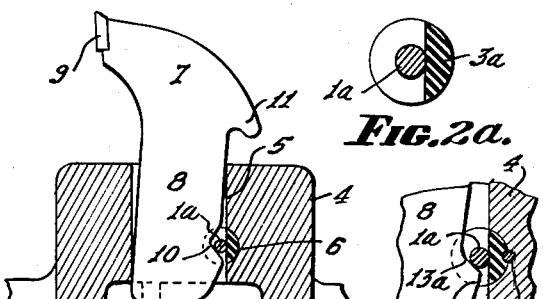
Figure 2a is a transverse sectional view of yet another form of resilient means.
Figure 6 is a sectional view taken longitudinally through a socket member and showing in place a bit shank of somewhat different form.

The simplest form of the resilient means of this invention is illustrated in Figure 1, and consists of a metallic or other pin 1, preferably but not necessarily of hardened steel, encased in a body of resilient substance 3. In the central portion of this structure the resilient substance is cut away so as to expose the pin at one side as at 1a. In this central portion about half of the body of the resilient substance may be removed as illustrated in Figure 2 leaving a portion 3a behind the pin. Or, as shown in Figure 2a, more of the resilient substance may be removed so as substantially to free the pin. While it is preferred to form the device as shown in Figure 1, the pin may be encased solidly in the rubbery substance, excess portions of it being later sheared away when a shank is driven into a socket member in which the resilient means is installed.

The structure shown in Figures 1, 2 and 2a may readily be formed in a mold wherein the resilient substance is molded and hardened by polymerization against the pin. The resilient substance may be natural rubber, butadiene-styrene copolymer, butadiene acrylonitrile copolymer or chloroprene; and it may contain fillers, accelerators, vulcanizing agents and hardeners as well known in the art of making and using such rubbery substances. To gain special effects, combinations of these rubbery substances may be employed. Excellent results have been obtained with chloroprene, such as neoprene, the rubbery substance being highly resistant to acid mine waters and oils and greases with which it may come in contact. While it is preferred to vulcanize or harden the rubbery substance against the pin so that they become permanently joined together, it is within the purview of the invention to make the parts separately and then assemble them. The mold may be so configured as to disclose the portion 1a of the steel rod as will be readily understood.

Figure 5:
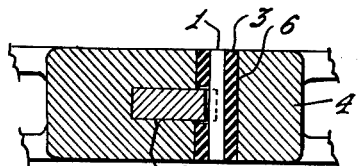
Figure 5 is a transverse sectional view taken along the line 5—5 of Figure 4.
Figure 4:
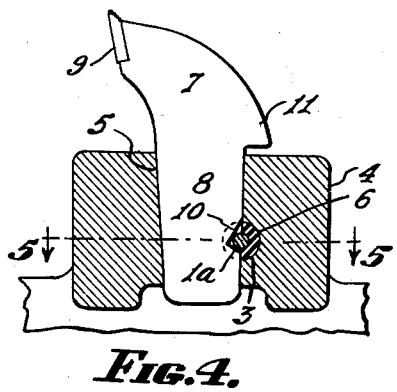
Figure 4 is a longitudinal sectional view of a socket member showing an exemplary bit in position therein.

A mode of use of the resilient means above described is illustrated in Figures 4 and 5. A socket member is shown at 4. While this socket member has been indicated as part of a mining machine chain link, it will be understood that it could be part of a cutting head or other device on mining or other machinery, including machine tools, designed to take one or a plurality of bits, cutting tools or other operating elements having shanks.

The socket member has at least one shank-receiving perforation 5. The resilient means lies in a transverse hole 6 intersecting the shank-receiving perforation in such a way that when the resilient means is placed in the hole, the pin, at its central portion 1a, will lie at least partially within the perforation. In the simplest construction, the resilient body 3 has such a diameter that it must be compressed slightly to enter the transverse hole 6, and this will produce a sufficient engagement to hold the resilient means in place, especially since the cut-away portion of the resilient body coincides with the dimension of the shank-receiving perforation, so that the shank of a cutter bit will help to retain the resilient means by engagement with the larger end portions of the resilient body, as will be evident from Figure 5. Thus the resilient means is readily installed and as readily removed by a simple driving action, although it is possible to provide retaining means attached to the socket member at the ends of the resilient means, as for example a plate held on the socket member by screws or other means. It will be understood that a snug engagement of the resilient means in the hole 6 prevents the entry of cuttings and corrosive mine waters.

In Figure 4 the bit is shown as a mining machine cutter bit having a head 7 and a shank 8. The head has a cutting point 9 usually but not necessarily an inset of hard material such as tungsten carbide. The shank in this instance is shown as tapered, the perforation 5 having a corresponding taper, so that gauge is established. However, the shank may be straight or otherwise configured, and gauge may be otherwise established as will later appear. Instead of a unitary cutting bit, the combination of a bit holder having a shank and a renewable bit engaged in the bit holder may be employed, as shown in the copending application referred to above.

The shank 8 is provided with a notch 10, the lower operating surface of which is disposed slantwise as shown. The central portion 1a of the pin engages in this notch. The bit is installed by placing the end of its shank in the socket perforation 5, and driving the bit home, as by blows on the bit head with a suitable hammer-like means. During this installation, the pin 1 will be displaced laterally against the resilience of the rubbery body 3 including those portions which lie wholly within end portions of the hole 6. It may be noted that the displacement of the pin compresses the rubbery body at one side but relieves pressure on it at the opposite side, so that the rubbery substance is free to be resiliently displaced around the pin. Thus, the problem of providing spaces into which a rubbery body can expand laterally while it is being compressed longitudinally is not encountered.

When the bit shank is in place, as shown in Figure 4, the central portion 1a of the pin enters the notch 10. The engagement of the pin with the slantwise disposed lower operating surface of the notch exerts a downward force on the bit shank, holding it securely in the socket member. When it is desired to remove the bit, this may be done by a simple prying action, accompanied by the same displacement of the pin as has been described above. A shoulder 11 is preferably provided on the bit head, and a prying device having an end like a crow bar may be engaged with the top of the socket member and beneath the shoulder 11 for bit removal. By varying the angle of the operating surface of the notch, and in instances the cross sectional shape of the pin, the force required to remove the shank can be varied over a very wide range.

In the remaining figures of this application, analogous parts have been given the same index numerals. Figure 6 shows a structure in which the bit shank 8 is straight rather than tapered, and has a relatively loose engagement in the socket member perforation 5. Gauge in this particular embodiment is determined by an abutment, strap or stop 12 at the bottom of the perforation 5. The engagement of the central portion of the pin in the notch 10 is shown. Since the pin will have a forward and downward reaction on the shank, it will be seen from Figure 6 that if the abutment 12 is located far enough in the forward direction, the shank of the bit may be tilted in such fashion that its lower forward edge is brought against the forward surface of the perforation 5, while its upper rearward edge is brought against the rearward surface of the perforation 5. This is the proper position of the shank for sustaining the strains of cutting and transferring these strains to the socket member. Whether or not the resilient means produces the illustrated shank tilt as the bit is installed it will be evident that it may tend to maintain this position of the shank once it has been assumed. It will also be evident that none of the strains of cutting will be applied against the resilient means, since it is located near the lower rear edge of the shank.

Figure 7:
Figure 7 is a partial view of similar character showing particularly another form of bit shank.

Figure 7 indicates that a protuberance 13 may be provided on the shank in lieu of the notch 10. The protuberance has a slantwise disposed upper operating surface 13a which coacts with the central portion 1a of the pin in the way hereinabove described.

Where a portion of the rubbery substance 3 is left behind the pin in its central portion, as at 3a in Figures 2 and 2a, it will be clear that the resilient means should preferably be so installed that this portion of the rubbery substance does not project into the socket-receiving perforation 5. When the resilient means has once been properly installed, the tightness of its engagement in the hole 6 is normally enough to prevent any rotation which would disturb the predetermined relationship. However, if desired, a pin 16 (Figure 7), lying partly in a groove in the socket member, may be driven in so as to engage a body of rubbery substance and inhibit rotation. It is also within the scope of the invention to provide the resilient means, as shown in Figure 21 with a flat 17 or other non-circular configuration, and to give the hole 6 in the socket member a similar configuration, which may be done by broaching. This not only enforces the installation of the resilient means in the correct orientation but prevents subsequent rotation.

Figure 3:
Figure 3 is a transverse sectional view of a modified form of resilient means.

In Figure 3 a modified resilient means is shown, differing from those hereinabove described in that the pin and the rubbery body are encased in a metallic or other tube 18. As before, this may be a unitary structure in which the rubbery substance is hardened or vulcanized against the other parts. The tube 18 will be cut away so as to disclose the bare portion 1a of the pin, as shown. The structure of Figure 3 may be used in various ways. The tube may be given a driving fit in the hole 6. The tube may be given a non-circular configuration as described in connection with Figure 21. End portions of the tube, if metallic, may extend beyond the ends of the rubbery body, and these end portions may be peened or riveted over against the outer sides of the socket member, not only to prevent axial displacement of the resilient means but also to prevent rotation.

Two additional pins are shown respectively in Figures 22 and 23. In the first of these figures, the pin has squared or otherwise non-circular end portions 33 and 34, which coact with the rubbery substance in which they will be embedded to prevent rotation of the pin. Figure 22 is also illustrative of the fact that the central portion 35 of the pin may differ from the remainder of the pin both in size and in cross sectional shape. It may be made of any size commensurate with the dimensions of the hole through which it is to be passed; and it may be made of any desired cross sectional shape for coaction with an operating surface, groove or projection on a shank.

In Figure 23 a pin is shown having fluted end portions 36 and 37 to help prevent rotation, and a central portion 38 which is provided with a flat 39 for coaction with an operative surface on a shank.

Figure 8:
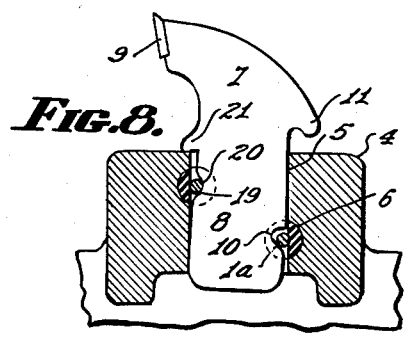
Figure 8 is a similar view showing the use of two resilient controlling means.

Figure 8 shows the use of a second resilient means to obtain a tilting action in a socket member in which the shank has a loose fit. The first resilient means will be located near the lower end of the shank as before, and the pin, coacting with the notch 10, will exert a forward and downward action on the shank, insuring that the lower front edge of the shank engages the front surface of the shank-receiving perforation 5. Another resilient device, indicated generally at 19, may be located as shown near the upper forward edge of the shank and will serve to rock the shank in such fashion that its upper rearward edge contacts the inner surface of the perforation 5. The pin of the upper resilient means may engage in a notch 20 in the shank 8; but if the shank has a loose enough fit in the socket-receiving perforation, a notch may not be found necessary. In theory it would be possible so to configure the central portion of the pin of the upper resilient member and the notch 20 that these elements in coaction would determine gauge; but this would result in downward components of the strains of cutting being imposed on the upper resilient member, and chattering is likely to result where such downward components are present. Consequently, it is usually preferred to determine gauge in some other way as by the means illustrated in Figure 6, or by the provision of a gauge-determining shoulder 21 at the forward part of the top of the shank.

Figure 9:
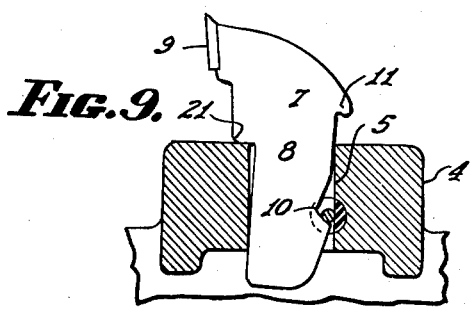
Figure 9 is a similar view showing another arrangement.

Figure 9 is also illustrative of a structure in which gauge is determined by a forward abutment 21. The central portion of the pin engages the notch as hereinabove described, and if the lower operating surface of the notch 10 has a suitable slantwise configuration, it will be evident that while the operation of the resilient means in Figure 9 will not necessarily initially produce a tilting of the shank in the socket member, once that tilting has been produced by operation of the cutting means, the resilient means will tend to maintain it thereafter.

Figures 11, 12:
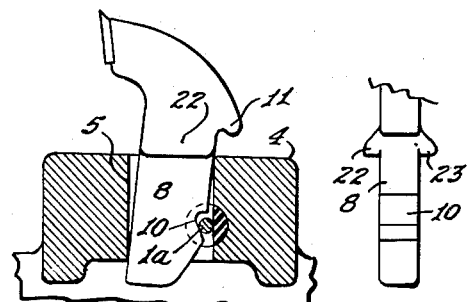
Figures 10 and 11 are similar views showing relationships of socket member resilient devices and bit shanks wherein tilting is achieved.
Figure 12 is a partial end elevation of the bit employed in the structure of Figure 11.

There are other ways in which tilting may be attained. As shown in Figures 11 and 12, shoulders 22 and 23 may be formed at the top of the bit shank for contacting the upper surface of the socket member 4. These shoulders will not only determine gauge, but if formed aslant on the bit structure as illustrated in Figure 11, they will coact with the resilient means in tilting the shank to the correct cutting position.

Figure 10:
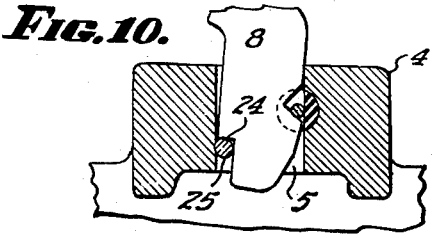

Another structure is shown in Figure 10 wherein the lower forward edge of the shank 8 is configured to present an abutment 24 which coacts with a stop in the shank-receiving perforation 5 of the socket member. The stop may be in the form of a pin 25 which has a driven fit in a perforation extending transversely of the socket-receiving perforation in such position that the pin 25 will lie partially or wholly within the socket receiving perforation. The pin 25 in the structure of Figure 10 thus not only serves to establish the cutting gauge of the bit, but since the pin of the resilient means (located at the trailing side of the bit) exercises a downward thrust, the bit shank will be tilted to the correct position for transferring the strains of cutting to the socket member.

Yet another expedient is illustrated in Figures 13 to 16 inclusive. Here the hole 6, which accepts the resilient means, is so located that it is parallel to the side or longer transverse dimension of the shank-receiving perforation 5. The central portion of the pin projects as before into the shank-receiving perforation. The shank in this instance has the notch 10a (which coacts with the central portion of the pin) formed on its side and formed aslant as will be clear from Figures 13 and 16. This will produce a tilting of the bit, and gauge may be determined by an abutment or shoulder 26 at the rearward side of the bit head.

Figure 17 illustrates the fact that the resilient means may be employed merely to urge the bit shank in one direction, and may itself coact with a fixed member in producing a downward component of force. As illustrated, the bit shank 8 has a notch 27 in its forward edge, this notch having a slantwise lower operating surface. A fixed member 28 is provided having a nose of conical or other shape to coact with the operating surface of the notch 27 so as to urge the bit downwardly in the perforation 5 when the bit is urged forwardly against the fixed member. The fixed member may be in the form of a pin, driven, threaded, or otherwise fastened in a transverse perforation in the socket member 4. Gauge may be determined by the rear shoulder 26. The resilient means urges the bit forwardly in the socket-receiving perforation and against the nose 29. It is not necessary that the central portion of the pin of the resilient means engage in a notch in the shank 8. However, in this structure it is advisable to give the shank a close fit in the socket-receiving perforation 5 at the top since otherwise chattering may be encountered.

Figure 20 shows a type of structure in which the resilient means acts to urge the bit forwardly and downwardly in the socket member, with gauge determined by a rear shoulder 26 in the bit head. Here again it is desirable to have the shank fit relatively closely in the shank-receiving opening 5 at the top if chattering is to be avoided.

Yet another structure is shown in Figures 18 and 19. In this structure a type of resilient means is employed in which the body of rubbery material is entirely removed about the central portion 1a of the pin. The hole 6 to receive the resilient means is located transverse the socket-receiving perforation 5, but in such fashion that the central portion 1a of the pin extends freely through the socket-receiving perforation. The hole 6 may be located if desired so that the central portion 1a of the pin extends centrally across the perforation 5.

With this structure, a bit is used having a shank 8 which is slotted from the bottom upwardly. The slot has a main portion 30 which is so positioned that the pin must be displaced to pass through it. At the lower end of the main portion of the slot, there will be a beveled or rounded surface 31 which will act to displace the pin when the shank is inserted in the socket member and driven home. At the top of the main portion of the slot, there will be a laterally extending portion 32 to accept the pin after the shank has been driven home. The laterally extending portion 32 may have various shapes, but is preferably so configured that the central portion of the pin will exert a downward and forward force on the bit shank by engaging the lower surface of the slot portion 32. Chattering can be avoided in such a structure by providing a fairly close fit for the shank in the perforation 5, or by the use of such expedients as have hereinabove been described in connection with Figures 8, 10 and 11.

Modifications may be made in the invention without departing from the spirit thereof. The invention having been described in certain exemplary embodiments, what is claimed as new and desired to be secured by Letters Patent is:

1. A socket member comprising a body having a perforation to receive a shank, said body having a hole extending transversely of said perforation and intersecting it, a pin extending in said hole across said perforation so that at least part of the central portion of said pin is located within said perforation, the end portions of said pin located beyond said perforation being mounted within said hole in surrounding bodies of rubbery resilient substance so that the said central portion of said pin will be resiliently displaceable transversely of the axis of said pin within said perforation.

2. In combination a socket member comprising a body having a perforation to receive a shank, said body having a hole extending transversely of said perforation and intersecting it, a pin extending in said hole across said perforation so that at least part of the central portion of said pin is located within said perforation, the end portions of said pin located beyond said perforation being mounted within said hole in surrounding bodies of rubbery resilient substance so that the said central portion of said pin will be resiliently displaceable transversely of the axis of said pin within said perforation, and a structure having a shank adapted to enter said perforation and be engaged by the central portion of said pin, said pin being displaceable to permit said shank to be driven into said perforation, and thereafter engaging said shank resiliently to assist in retaining said shank in said perforation.

3. The structure claimed in claim 2 wherein said shank has a surface for engagement with the central portion of said pin, said surface being located aslant to the axis of said shank, whereby the central portion of said pin exerts a force having a downward component on said shank.

4. The structure claimed in claim 3 wherein said surface is a part of a notch formed in said shank.

5. The structure claimed in claim 3 wherein said surface is a part of a notch formed in said shank, said notch being located in the lower rear edge of said shank and said pin being located to engage the said surface of said notch.

6. The combination claimed in claim 3 including means for limiting the passage of said shank into said perforation, whereby gauge is established.

7. The combination claimed in claim 5 wherein said shank is the shank of a cutting tool having movement with respect to a material to be cut, including means coacting with said resiliently mounted pin to produce a tilting of said shank in said perforation such that the top portion of the trailing edge of said shank during said motion and the bottom portion of the leading edge of said shank during said motion of said shank contact the surfaces of said perforation.

8. The structure claimed in claim 7 wherein said coacting means for tilting said shank comprise lateral ribs located at the top of said shank for contacting an upper edge of said socket member, the lower edges of said ribs being located aslant to the axis of said shank.

9. The structure claimed in claim 7 wherein said pin extends transversely of said perforation in the direction of said motion whereby to contact a side portion of said shank extending substantially parallel to said direction of motion, and wherein the means for producing a tilting of said shank comprises a slantwise disposition of a notch formed in the said side of said shank.

10. The structure claimed in claim 7 wherein the means for tilting said shank comprises a gauge determining abutment having contact with a coating abutment formed on the leading edge of said shank, said coacting abutments being so located with respect to said pin that the downward thrust exerted by said pin will tend to rock said shank about said coacting abutments.

11. The structure claimed in claim 7 wherein the means to tilt said shank comprises a second pin similarly resiliently mounted and located to contact the leading edge of said shank at a position above the point of contact of said first mentioned pin.

12. In combination a socket member comprising a body having a perforation to receive a shank, said body having a hole extending transversely of said perforation and intersecting it, a pin extending through said hole and across said perforation so that at least part of the central portion of said pin is located within said perforation, the end portions of said pin located beyond said perforation being mounted within said hole in surrounding bodies of rubbery resilient substance so that the said central portion of said pin will be resiliently displaceable transversely of its axis within said perforation and a structure having a shank adapted to be driven into said perforation so as to displace said pin, whereby said pin urges said shank in one direction transversely of said perforation, and means at the opposite side of said shank from said pin extending into said perforation and shaped to contact a surface formed on said shank aslant to the shank axis so that when said shank is resiliently urged aganist said last mentioned means by said pin, said last mentioned means will exert a downward reaction on said shank, and means for limiting the downward movement of said shank in said perforation.

13. In combination a socket member comprising a body having a perforation to receive a shank, said body having a hole extending transversely of said perforation and intersecting it, a metallic pin extending through said hole and freely across said perforation so that the central portion of said pin is entirely located within said perforation and spaced from the opposite sides thereof, the end portions of said pin located beyond said perforation being mounted within said hole in surrounding bodies of rubbery resilient substance so that said central portion of said pin will be resiliently displaceable transversely of its axis within said perforation, and a structure having a shank, said shank having a slot extending inwardly from its lower end in a substantially axial direction, said slot having a central portion so located as to displace said pin when said pin is caused to pass through it by driving said shank into said perforation, said slot having an upper portion located at an angle to said main portion and adapted to receive the central portion of said pin after it has passed through the remainder of said slot.

14. In combination a socket member comprising a body having a perforation therein to receive the shank of a cutter bit, said body having a hole extending transversely of said perforation and intersecting it, a resilient retaining means comprising an elongated metallic pin encased in a body of resilient substance of substantially larger cross sectional dimension than said pin, said resilient retaining means lying within said hole so that said pin extends across said perforation adjacent an edge thereof and into said socket member on each side thereof, the said body of resilient substance being cut away within said perforation so as at least partially to expose said pin, and a cutter bit structure having a shank adapted to enter said perforation and be engaged by the central portion of said pin, said shank having a forward edge and a rearward edge, the latter edge being engaged by said pin, said shank having an upwardly and outwardly slanting surface at the lower end of its rear edge of sufficient depth at the lower end of the shank to permit the engagement of the lower end of said shank within said perforation slightly beyond said pin and having a configuration to cause displacement of said pin against the resilience of said rubbery substance as said shank is driven into said perforation, means at the top of said shank to limit the distance to which said shank may be driven into said perforation, the rear edge of said shank being configured above said slanting surface to provide an oppositely slanting surface to be resiliently engaged by said pin when said shank is driven fully into said perforation so as to urge said shank forwardly and downwardly, the angularity of said oppositely slanting surface being such as to displace said pin for the release of said shank when a prying force is exerted on said cutter bit.

15. A resilient retaining means for holding a shank in a perforation in a socket member comprising an elongated pin having end portions and a central portion, the end portions of said pin being peripherally encased in bodies of resilient rubbery substance of sufficient mass to permit resilient movement of said pin transverse its axis when said bodies are engaged in end portions of a hole in said socket member, a central portion of said pin, of a length sufficient to extend across one dimension of the shank to be engaged, being exposed for said purpose, said bodies of resilient substance having engagement with end portions of said pin, and having a cross-sectional shape and dimensions such that said resilient controlling means is insertable as a unit in the hole in the socket member and withdrawable therefrom as a unit for replacement.

16. The structure claimed in claim 15 wherein said bodies of resilient rubbery substance have a generally cylindrical contour.

17. A resilient retaining means for holding a shank in a perforation in a socket member, comprising an elongated pin having end portions and a central portion, the end portions of said pin being peripherally encased in bodies of resilient rubbery substance of sufficient mass to permit resilient movement of said pin transverse its axis when said bodies are engaged in a hole intersecting the perforation in the socket member, there being a connecting body of resilient rubbery substance between said first mentioned bodies, substantially confined to one side of said pin, and so shaped as to expose, at one side, the central portion of said pin.

18. The structure claimed in claim 17 wherein said resilient rubbery substance is hardened against said pin so as to be adherent thereto.

19. The structure claimed in claim 17 wherein said bodies of resilient rubbery substance have a generally cylindrical contour with a longitudinally extending noncylindrical portion.

20. A socket member comprising a body having a perforation to receive the shank of a cutting tool, and a resilient retaining means comprising an elongated pin encased in a body of resilient rubbery substance, said resilient body being located in a hole in said socket member extending transversely of and intersecting said perforation so that at least part of the central portion of said pin extends within and transversely of said perforation, end portions of said body of resilient rubbery substance and end portions of said pin extending in said hole beyond the confines of said perforation, the said body of resilient substance being cut away within said perforation to expose the said central portion of said pin.

21. In combination, a socket member having a perforation to receive the shank of a cutting tool, said socket member also having a hole extending transversely of said perforation and intersecting it, a metallic member having a portion to engage a surface of a notch in the shank of the cutting tool so as to hold the tool in the shank when inserted therein, said metallic member extending across said perforation in said hole with end portions of said metallic member extending beyond said perforation into end portions of said hole on both sides of said perforation, the said end portions of said metallic member at least being backed within said hole by bodies of rubbery resilient substance sufficiently compressible to permit movement of the engaging portion of said metallic member so as to clear the notch whereby to permit withdrawal of the cutting tool.

References Cited in the file of this patent

UNITED STATES PATENTS

| | | |
|---|---|---|
| 1,472,371 | Masury et al. | Oct. 30, 1923 |
| 1,823,168 | Read | Sept. 15, 1931 |
| 1,861,053 | Dykstra | May 31, 1932 |
| 1,862,623 | Harrington | June 14, 1932 |
| 2,115,994 | Lamb | May 3, 1938 |
| 2,168,794 | Fulke | Aug. 8, 1939 |
| 2,427,651 | Bear | Sept. 23, 1947 |
| 2,546,457 | Launder et al. | Mar. 27, 1951 |
| 2,743,917 | Krekeler et al. | May 1, 1956 |
| 2,790,668 | Friedman et al. | Apr. 30, 1957 |
| 2,798,715 | Brown | July 9, 1957 |
| 2,846,790 | Davis et al. | Aug. 12, 1958 |
| 2,907,559 | Brown et al. | Oct. 6, 1959 |

FOREIGN PATENTS

| | | |
|---|---|---|
| 392,773 | Great Britain | May 25, 1933 |

UNITED STATES PATENT OFFICE
CERTIFICATE OF CORRECTION

Patent No. 2,965,365                                                  December 20, 1960

Claude B. Krekeler

It is hereby certified that error appears in the above numbered patent requiring correction and that the said Letters Patent should read as corrected below.

Column 10, line 26, for "tool in the shank" read -- shank in the perforation --.

Signed and sealed this 5th day of September 1961.

(SEAL)
Attest:

ERNEST W. SWIDER                                      DAVID L. LADD
Attesting Officer                                          Commissioner of Patents

USCOMM-DC